United States Patent [19]

Flatau

[11] 4,052,927
[45] Oct. 11, 1977

[54] AUTOROTOR LAUNCHING SYSTEM

[75] Inventor: Abraham Flatau, Edgewood, Md.

[73] Assignee: The United States of America as represented by the Secretary of the Army, Washington, D.C.

[21] Appl. No.: 578,958

[22] Filed: Sept. 1, 1966

[51] Int. Cl.$^2$ ............................................. F41F 5/00
[52] U.S. Cl. ................................................ 89/1.5 R
[58] Field of Search ............... 89/1.5, 1.5 F, 1.808; 102/7.2

[56] References Cited

U.S. PATENT DOCUMENTS

| 3,084,598 | 4/1963 | Coslowsky | 89/1.808 |
| 3,264,985 | 8/1966 | Reed | 89/1.5 |

Primary Examiner—Charles T. Jordan
Attorney, Agent, or Firm—Nathan Edelberg; Robert W. Church

[57] ABSTRACT

An airborne launcher and method of delivering a munition system comprising in combination (a) means to rotate the autorotor to a predetermined angular velocity prior to release from the launcher (b) means which direct the rotation of the autorotor in a clockwise or counterclockwise direction resulting in the desired angle of glide of the munition to a preselected area without the aid of the forward speed of the airborne vehicle.

15 Claims, 19 Drawing Figures

INVENTOR.
Abraham Flatau
BY Harry M. Saragovitz,
Edward J. Kelly, Herbert Berl
& Benjamin G. Colley
ATTORNEYS

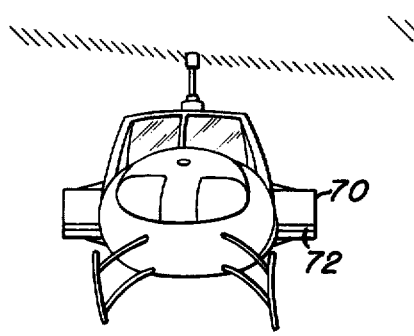
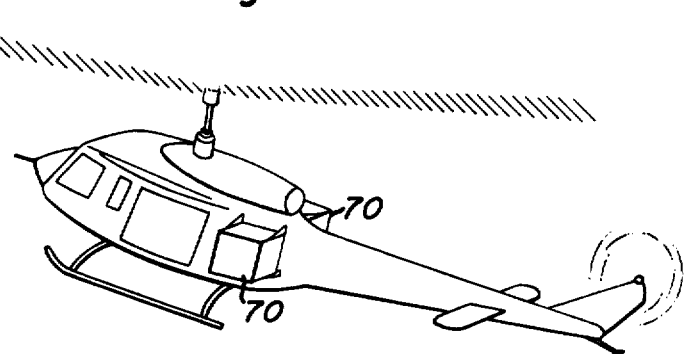
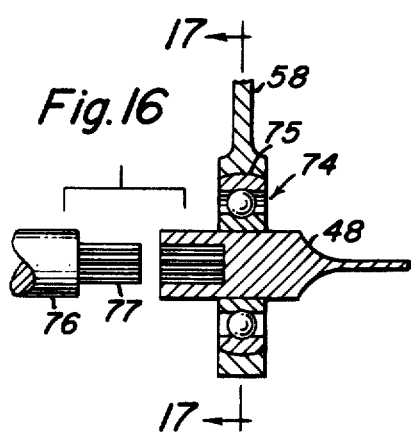
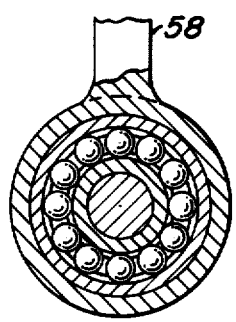
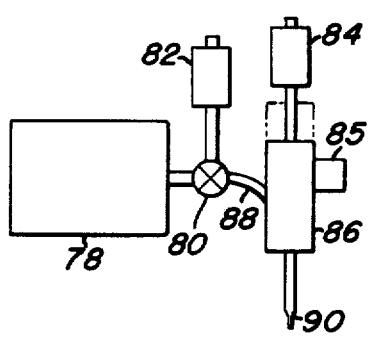
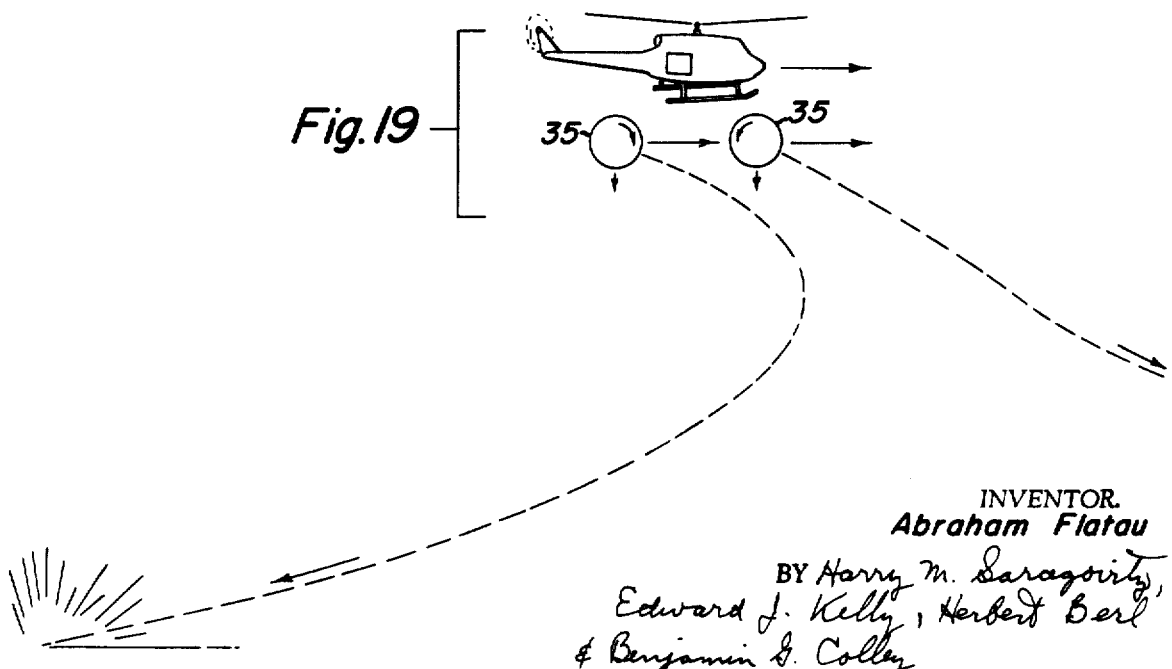

4,052,927

AUTOROTOR LAUNCHING SYSTEM

This invention relates to a system for launching autorotating shapes. In particular, this inventin is concerned with the mechanism for prespinning an autorotor followed by its ejection into the air from an aircraft such as a helicopter or a low speed conventional airplane.

The main object of this invention is to provide a launching system or apparatus which will enable the pilot of a helicopter or a similar airborne vehicle to hover in a relatively safe position and launch autorotors in the general direction of the target area so that the autorotors will hit the target area at a considerable distance from the position of the aircraft or to fly toward the target area, launch from a safe distance, and leave without overflying the target area.

A further object of this invention is to provide a munitions system which is more economical than the previous methods employed in the prior art.

A still further object of this invention is to provide a munitions system which gives an aircraft occupant the ability to hit a target even after the aircraft passed over the target.

A final advantage of my invention is that the launching system provides a bomblet which is self-powered. By this I mean that the need for a rocket motor is eliminated since the bomblets having this particular geometry generate a rapid angular velocity during their glide to the ground which produces a Magnus lift force which in turn is responsible for the large angle of glide. Generally speaking, an application of this Magnus effect to kites is shown in the U.S. Pat. to Van Ittersum, No. 2,107,808 .

Various methods were used in the past to drop munitions from aircraft. Examples of these prior devices are shown in the U.S. Pat. to Johnson, No. 2,706,097, the U.S. Pat. to Girdwood, No. 1.901.957, the U.S. Pat. to Frazer, No. 2,324,146, and the U.S. Pat. to Weissman, No. 2,380,278. These prior devices were simply dropped or ejected from the airplane and were carried downwardly by the air currents existing over the target area. My present invention provides a system whereby the autorotating body can be aimed in a preselected direction and will maintain its heading in spite of wind gusts or air currents and will reach the selected target.

A typical autorotor which can be launched by my invention is shown and described in my copending Application Ser. No. 568,682 filed on July 28, 1966, now U.S. Pat. No. 3,954,057, entitled, "RADIO CONTROLLED WING ROTOR BOMBLET".

As a result of my studies leading up to the present invention, I have found that the range or trajectory of the autorotor which is ejected by my launcher is basically dependent upon the pre-spin angular velocity, the launch velocity, the direction of the angular velocity, and the launch angle. Obviously, the aircrafts forward velocity adds to the range achieved by the autorotors by extending the trajectory accordingly.

As is pointed out above, the direcrtion of rotation of the autorotors before launch has a great effect on their trajectory after launch. For example, if the autorotor is rotating counterclockwise as viewed from the starboard side of the aircraft, the autorotor will glide forward in the same direction as the aircraft due to the positive lift on the autorotor. On the other hand, if the direction of rotation is clockwise, the autorotor will execute a reverse downward loop and will impact the ground at a point to the rear of the point of release. Thus, it is possible for the aircraft occupants to hit a target after they have flown over it or to fly towards a target, launch the autorotor, then veer away to a place of safety while the autorotor continues on to the target.

Other objects and advantages of this invention will become obvious as the following description is read and considered in view of the accompanying drawings in which:

FIG. 14 is a view showing a typical location of the launching mechanism outside the aircraft.

FIG. 15 is a side view of FIG. 14.

FIG. 16 is a detailed partial cross-sectional view of the declutch mechanism shown in FIG. 9.

FIG. 17 is a view taken on section 17-17 of FIG. 16.

FIG. 18 is a view of an alternative air-driven prespin motor with an alternative declutch mechanism.

FIG. 19 is a view showing the effect of the direction of rotation of the autorotors on their trajectory. The autorotors are shown greatly enlarged in relation to the helicopter for purposes of clarity.

Figure 4:
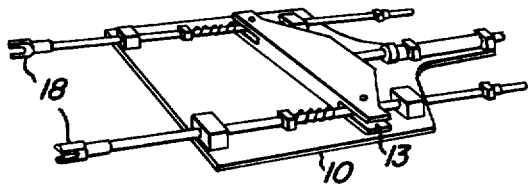
FIG. 4 is an isometric view similar to FIGS. 1 and 2 of the underside of the top plate showing the position of various parts with greater clarity.

Referring to the drawing, 10 designates the base plate which is provided with a yoke 12. The yoke has attached to it, by means of pins 17, two push rods 16. At the end of the push rods 16 are mounted two horseshoes 18. The push rods are slideably received in bearing blocks 32 mounted on the underside of the base plate 10. The push rods 16 are provided with adjustable front stops 22 and adjustable rear stops 24. At the rear of the base plate 10 is mounted a modified breach mechanism generally shown at 30 which is provided with cooling fins 28 and a piston rod 26 which connects the yoke 12 with a piston (not shown) which slides in the barrel of the modified breach mechanism 30 which can be designated to fire blank cartridges whose caliber and propellant charge are dependent upon the weight of the autorotors to be ejected. For example, an autorotor of 10 lb. weight will require a 30 caliber blank cartridge to provide high initial ejection velocities if desired. The yoke 12 has a slot 13, FIG. 4, to receive the push rods 16.

Figure 1:
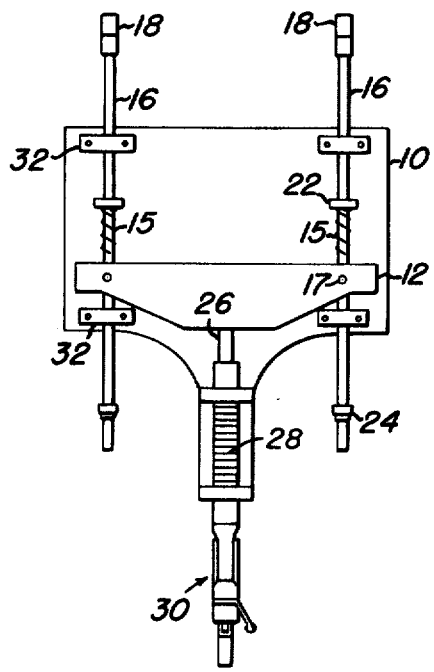
FIG. 1 is an underside view of the top plate of the launching device before launch.
Figure 2:
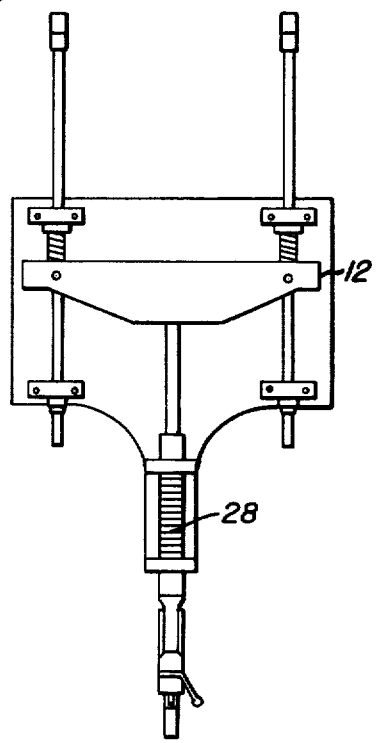
FIG. 2 is a view similar to FIG. 1 showing the position of the launching device after the autorotor has been launched.
Figure 3:
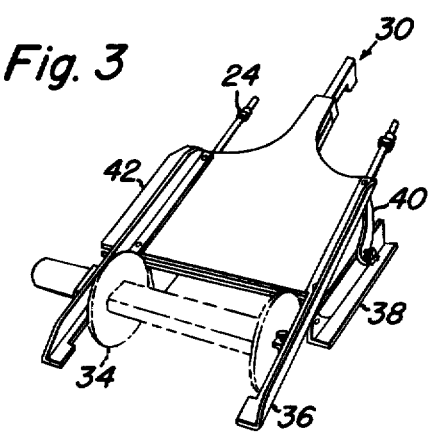
FIG. 3 is an isometric view of the launching device with a typical rotor shown in dotted lines.
Figure 6:
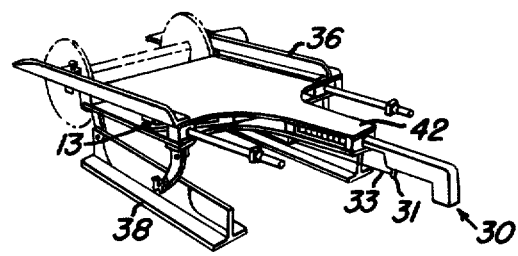
FIG. 6 is a similar isometric view showing more of the details of the launching device.
Figure 5:
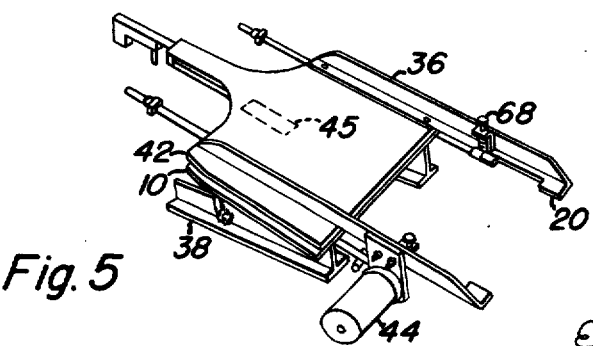
FIG. 5 is another isometric view similar to FIG. 3 showing the opposite side thereof.

The base plate 10 is provided with a cover plate 42 shown in FIGS. 3, 5, and 6. The cover plate is also provided with a pair of side rails 36. Integral with side rails 36, a safety release detent 20 is provided adjacent the forward end thereof. A hold-down pin assembly 68 is also provided on the side rails intermediate the safety release detent and the cover plate 42. The assembly of the cover plate and base plate is pivotly secured to the base angle irons 38 by means of the adjustable angular slide 40. Beneath the base plate and in line with the breach mechanism is provided a firing solenoid 45. The firing solenoid 45 is connected to the trigger 31 of the breach mechanism by a rod 33. Attached to the side rails 36 is a D.C. electric motor 44 for prespinning an autorotor shown in dotted lines at 34.

Figure 9:
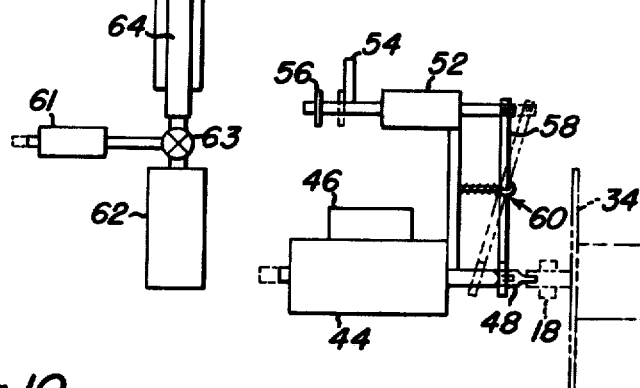
FIG. 9 is a diamgrammatic sketch showing the prespin motor and the disengaging apparatus associated therewith.

For purposes of clarity, the details of the declutching mechanism have not been shown in FIGS. 3, 5, and 6. However, these details are illustrated in FIGS. 9 and 16. Thus, the prespin motor 44 (FIG. 9) has associated with it a tachometer and switch shown at 46. The prespin motor has a retractable drive pin 48 which drives the spindle 35 of the autorotor 34. The declutch mechanism is activated by solenoid 52 which moves the disengaging lever 58 so as to retract the retractable drive pin 48 out of engagement with the spindle 35 at the proper time. The disengaging lever 58 is mounted on a spring-biased ball and socket joint generally shown at 60. The shaft of the solenoid 52 has attached to it an adjustable stop 56 which actuates a microswitch 54.

In FIG. 16, the shaft 76 of the prespin motor 44 has a spline 77 on it which is slideably received in a mating socket on the drive pin 48. The disengaging lever 58 has a ball bearing set 74 located within the disengaging end thereof. The annular ball bearing set generally shown at 74 is received in a spherical socket 75 which allows the drive pin 48 and shaft 76 to stay in alinement during the axial movement of these parts.

Figure 7:
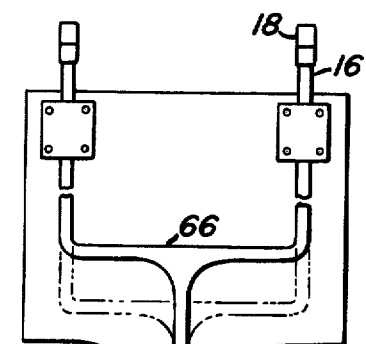
FIG. 7 shows the underside view of the top plate with a modified ejection system.

Other means for ejecting the rotating autorotor are shown in FIG. 7, in which the yoke 66 is connected to a fluid actuated piston 64. The valve 63 controls the air pressure tank 62 and is in turn controlled by the solenoid 61. The yoke 66 can have stops on it similar to the stops 22 and 24 on yoke 12. However, these stops have not been shown in FIG. 7, for purposes of clarity.

An alternate prespin motor and declutching means is shown in FIG. 18. An air motor or turbine 86 is provided which drives the drive pin 90. The former is driven by compressed air in a separate air tank 78 or alternatively, by the above mentioned air tank 62. The flow of compressed air is controlled by the valve 80 which is in turn controlled by the solenoid 82. The compressed air enters the air motor 86 by means of the flexible hose 88 where upon the former is rotated up to the desired speed and thus the drive pin 90 drives the autorotor at the same speed. When the desired or predetermined angular velocity of the autorotor is reached, a tachometer switch 85 similar to the one shown of 46 in FIG. 9 actuates the solenoid 84 to move the air motor 86 away from the autorotor. Thus, the autorotor 35 is declutched or disengaged from the prespin air motor 86.

The air motor is mounted on slideable bearings (not shown) attached to the side rails 36 similar to the mounting of the electric motor 44 in FIG. 5.

As before, the actuation of the solenoid 82 which controls the angular velocity of the drive pin 90 by means of valve 80 is initiated by the pilot or occupants of the aircraft when the proper target is reached.

In FIG. 19, I have shown the results obtained when the rotor 35 is spun in clockwise or counterclockwise direction. The operator of the launcher merely has to press a switch to reverse the voltage going to the D.C. motor 44 to obtain the trajectory he desires. Thus, if a reverse loop or negative lift is desired, the motor is spun clockwise (viewed from the starboard side). This negative lift gives the operator the ability to hit a target after the aircraft has passed over the target as in the case of dense vegetation where it is seen only from directly above. On the other hand, if the target is clearly visible or marked with smoke bombs, the operator can use positive lift mode and send the autorotors gliding to their distant target from a position of safety.

Figure 8:
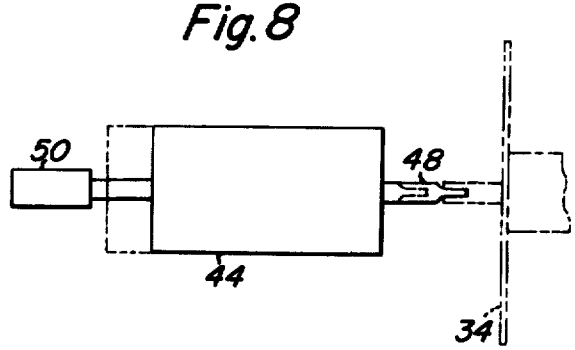
FIG. 8 shows a modified form of the disengaging means.

A further modification which is useful in this device is shown in FIG. 8, in which an electric prespin motor 44 is provided with a solenoid 50 which will retract the retractable drive pin 48 upon actuation by a tachometer switch which is shown in FIG. 9.

Figure 10:
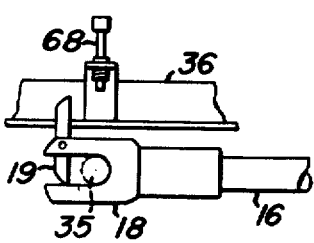
FIG. 10 is a detail of the horseshoe which is attached to the front of the suspension rod showing the spindle of the autorotor in its rotating position.
Figure 11:
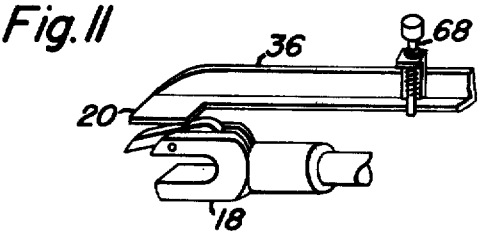
FIG. 11 is an isometric view of the horseshoe showing the release of the safety detent as the autorotor is ejected.
Figure 12:
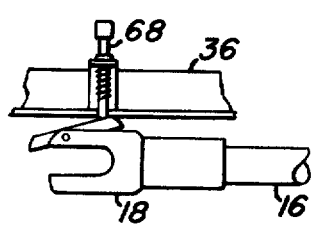
FIG. 12 is a detail similar to FIG. 10 showing how the horseshoe is loaded with an autorotor by means of the hold-down pin.

The hold-down pin 68 is provided with a conventional pin and slot latch mechanism whereby it can be locked in the loading position shown in FIG. 12. With the hold-down pin 68 in the position shown in FIG. 12, the safety detent 18 is effectively held out of the path of the entering spindle 35 of the autorotor 34 during the loading operation. After loading, the safety detent assumes its closed position due to the fact that it is springbiased in the closed position. This closed position is illustrated in FIG. 10. After the autorotor is prespun to the proper angular velocity, the launching means is actuated and the push rods 16 push the rotating autorotor to the point where the safety detent 19 contacts the safety detent release 20 as is shown in FIG. 11. Upon the push rods 16 reaching the limit of their travel as determined by the stops 22, the rotating autorotor is ejected into the airstream of the airborne vehicle and it immediately takes its predetermined angle of glide.

The operation of my device takes place in the following sequence. The breach mechanism is loaded with a blank cartridge. The horseshoes 18 are loaded with the spindles 35 of the autorotors as is shown in FIG. 12. The retractable drive pin 48 is then engaged with one of the spindles 35. The prespin motor is then actuated by the pilot, copilot, or crew chief of the aircraft. When the angular rotation of the autorotor reaches a predetermined amount (e.g., up to 4000 R.P.M. for a 10 lb. autorotor) the automatic switch associated with the tachometer 46 actuates the solenoid 52 to declutch the prespin motor. Immediately after the declutching operation, the stop 56 of the solenoid shaft actuates the microswitch 54. This microswitch in turn actuates the solenoid 45 or the solenoid 61 which fires the blank cartridge in the breach mechanism 30 or turns on the pneumatic pressure from the tank 62. In either event, the push rods are given a rapid acceleration ending abruptly when the stops 22 and 24 are reached. As the horseshoes 18 pass under the safety detent release 20, the safety detent 19 is thrown back or opened so that the spindles 35 of the autorotor 34 can be thrown with great force into the airstream surrounding the airborne vehicle.

Figure 13:
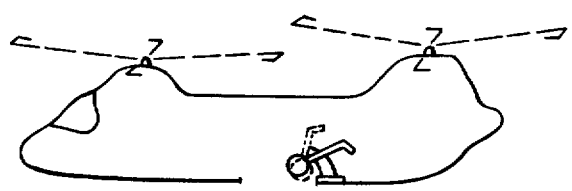
FIG. 13 is a diagrammatic sketch showing the location of the launching mechanism in the aircraft.

I have shown a single shot cartridge launching device. It is to be distinctly understood that this launching device can be provided with a belt cartridge feed so that the supply of blank cartridges can be automatic or semiautomatic as is desired. Likewise in the case of the autorotors, it is obvious that vertical feeding devices or clips can be supplied so that a continuous supply of autorotors can be supplied for my launching device similar to the feeding device shown in the patent to Buschers et al, U.S. Pat. No. 2,979,991. I have shown an internal mounting of my launching device in FIG. 13. An external mounting is shown in FIG. 14 and 15 in which 70 represents the housing within which the launcher and its feeding device or clip is mounted. An ejection slot 72 is provided in the forward face of the housing 70 to allow for the launching of the autorotors.

Throughout the specification and drawings, I have not detailed the various electrical connections, since these are obvious to persons skilled in the electrical art and would needlessly complicate the specification and drawings.

By the foregoing specifications I have shown an apparatus by means of which one can launch a high glide angle autorotating bomblet in a manner such that the trajectory and the resultant range is predetermined as a direct result of the interplay of the launch conditions such as prespin velocity, prespin direction, launch angle, and launch velocity. It is thus apparent that the autorotor can be controlled from the maximum range to zero by the proper selection of the above parameters.

Other various and sundry modifications of my invention will occur to those persons skilled in this art; however, I do not wish to be limited by the details described and shown in the above specification, but on the other hand wish to be limited solely by the scope of the claims.

I claim:
1. An autorotor launcher adapted to be mounted in an airborne vehicle, comprising in combination:
   a. means to rotate said autorotor to a predetermined angular velocity prior to ejection from said vehicle,
   b. means to launch said rotating autorotor from said airborne vehicle, whereby said autorotor body is stabilized and glides to the target area in a predetermined trajectory.
2. An autorotor launcher adapted to be mounted in an airborne vehicle comprising in combination:
   a. electric motor means to prespin said autorotor to a predetermined angular velocity prior to ejection from said vehicle.
   b. declutch means to uncouple said motor means from said autorotor,
   c. ejection means to launch said rotating autorotor from said vehicle, whereby said autorotor is launched in a stabilized mode and glides to the selected target in a manner whose trajectory may be predetermined.
3. A launcer for an autorotor, the latter having a pair of central end spindles, adapted to be mounted in an airborne vehicle comprising in combination:
   a. base means mounted to said vehicle,
   b. base plate means adjustably secured to said base means for pivotable movement in a vertical plane,
   c. slideable rod suspension means mounted on said base plate means whereby said autorotor is suspended for rotation about said spindles,
   d. motor means mounted on said base plate adjacent to and at a right angle to the axis of said suspension rod means and detachably engaging one of said spindles, whereby said autorotor can be prespun,
   e. disengaging means mounted on said base plate means whereby after a predetermined autorotor speed is reached said motor is disengaged from said spindle,
   f. ejection means mounted on said base plate remote from said suspension means, whereby said autorotor is ejected from said vehicle immediately after said motor means is disengaged.
4. An autorotor launcher as set forth in claim 3 in which said motor means consists of D.C. electric motor.
5. An autorotor launcher as set forth in claim 4 in which said disengaging means consists of:
   a. a solenoid mounted at the side of said electric motor means,
   b. a lever mounted between said solenoid and said electric motor means having the ends thereof engaging the shafts of said solenoid and said motor means, whereby said motor means disengages from said spindle when said solenoid is activated.
6. An autorotor launcher as set forth in claim 4 in which said disengaging means consists of:
   a. a solenoid mounted axially of said motor means and connected to the shaft of said motor means, whereby said spindle is disengaged from said shaft when said solenoid is actuated.
7. An autorotor launcher as set forth in claim 4 in which said ejection means consists of an explosive actuated yoke.
8. An autorotor launcher as set forth in claim 4 in which said ejection means consists of a pneumatically actuated yoke.
9. An autorotor launcher as set forth in claim 3 in which said motor means consists of an air turbine motor.
10. An autorotor launcher as set forth in claim 9 in which said disengaging means consists of:
    a. a solenoid mounted axially of said motor means and connected thereto whereby said spindle is disengaged when said solenoid is actuated.
11. An autorotor as set forth in claim 9 in which said ejection means consists of an explosive actuated yoke.
12. An autorotor as set forth in claim 9 in which said ejection means consists of a pneumatically actuated yoke.
13. Method of delivering from an airborne vehicle an autorotating munition body comprising: pre-spinning the said body prior to launching from said vehicle to a predetermined angular velocity which directs the rotation and the angle of glide of the said body to a preselected area without the aid of the speed of the airborne vehicle.
14. The method of claim 13 wherein the pre-spinning is in a counterclockwise direction to a predetermined angular velocity which directs the counterclockwise rotation and the angle of the glide of the said body to a preselected area which is forward of the point of release from the airborne vehicle.
15. The method of claim 13 wherein the pre-spinning is in a clockwise direction to a predetermined angular velocity which directs the clockwise rotation and the angle of glide of the said body to a preselected area at a point to the rear of the point of release from the airborne vehicle.

* * * * *